United States Patent
Birrell et al.

(10) Patent No.: US 10,362,733 B2
(45) Date of Patent: Jul. 30, 2019

(54) AGRICULTURAL HARVESTER CONFIGURED TO CONTROL A BIOMASS HARVESTING RATE BASED UPON SOIL EFFECTS

(71) Applicants: Deere & Company, Moline, IL (US); Iowa State University Research Foundation, Inc., Ames, IA (US)

(72) Inventors: Stuart Birrell, Ames, IA (US); Aaron J Bruns, Bettendorf, IA (US); Stephen Michael Patton, Rock Island, IL (US)

(73) Assignees: Deere & Company, Moline, IL (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 14/515,484

(22) Filed: Oct. 15, 2014

(65) Prior Publication Data
US 2015/0105984 A1    Apr. 16, 2015

Related U.S. Application Data

(60) Provisional application No. 61/891,088, filed on Oct. 15, 2013.

(51) Int. Cl.
*A01D 41/127*    (2006.01)

(52) U.S. Cl.
CPC .................. *A01D 41/127* (2013.01)

(58) Field of Classification Search
CPC ................ A01D 41/127; A01D 41/1271–1273
USPC ........................................................... 701/50
See application file for complete search history.

(56) References Cited

U.S. PATENT DOCUMENTS

| | | | |
|---|---|---|---|
| 8,393,137 B1 * | 3/2013 | Crosby | A01D 91/04 56/341 |
| 2002/0055902 A1 * | 5/2002 | Faeth | G06Q 30/06 705/37 |
| 2003/0014171 A1 * | 1/2003 | Ma | A01D 41/127 701/50 |
| 2010/0249953 A1 * | 9/2010 | Kishita | G05B 19/0426 700/12 |
| 2012/0245802 A1 * | 9/2012 | Schlesser | A01D 41/1243 701/50 |

FOREIGN PATENT DOCUMENTS

TW    200419045    * 10/2004

* cited by examiner

*Primary Examiner* — Imran K Mustafa
(74) *Attorney, Agent, or Firm* — Neal, Gerber & Eisenberg LLP; James P. Muraff (57) ABSTRACT

An agricultural harvester (100) has a control system (166) that is configured to control a biomass harvesting rate based upon electronically calculated soil effects.

19 Claims, 9 Drawing Sheets

AGRICULTURAL HARVESTER CONFIGURED TO CONTROL A BIOMASS HARVESTING RATE BASED UPON SOIL EFFECTS

RELATED APPLICATIONS

This application claims priority to U.S. provisional patent application No. 61/891,088 filed Oct. 15, 2013, which is incorporated by reference herein for all that it teaches.

FIELD OF THE INVENTION

This invention relates to agricultural harvesters. More particularly it relates to agricultural harvesters that are configured to control the harvesting of biomass based upon the soil effects of such biomass harvesting, and in particular the effects on soil quality and soil erosion.

BACKGROUND OF THE INVENTION

Reducing the erosion of and enhancing the quality of soil in agricultural fields is a problem around the world. Every operation performed on the soil in an agricultural field increases the chance that the soil will be eroded or reduced in quality.

Over the last 70 years significant efforts have been undertaken to better understand and quantify the effects that various field operations have on the field.

More recently, these research efforts have extended beyond characteristics of the operations themselves to other factors, that, alone or combined with the field operations, affect soil quality and soil erosion.

One can now determine the soil erosion effects and soil quality effects of a field operation performed on a particular soil type, or performed at a specific outside temperatures, or performed on soil with a specific moisture, or performed on soil with a specific soil horizons or performed on soil with a particular slope, or slope length or curvature, or performed on soils with particular compositions such as percent clay, percent sand, percent organic matter and percent silt.

The soil effects of a field operation can be calculated based not just on the general type of field operation, such as tilling, crop removal, biomass removal, fertilizing or herbiciding, and harvesting but on numerous parameters of each operation, such as the speed of the implement as it travels through the field, the weight of the towing vehicle, the number of tires, the footprint of the tires, the type and spacing and shape of the ground engaging tool on the implement that engages the soil, the depth to which the tool engages the soil, etc.

The process of calculating soil effects of a particular operation is further complicated by the interdependent nature of field operations. The effect of one field operation will depend upon the effect of a prior field operation or a subsequent field operation during a complete crop cycle. Thus, the length of the crop cycle, the types of crops planted in the crop cycle, the previous field operations performed in the crop cycle, the future operations to be performed in the crop cycle, over the entire crop cycle are interrelated and may be beneficially incorporated in the process of calculating soil effects of a particular field operation to determine the total soil effect of that operation over an entire crop cycle.

Thus, to most accurately determine the effect of a field operation, one should first determine the types and all parameters of the many field operation throughout the entire crop cycle. One should also consider the climate parameters, the terrain parameters, and the soil parameters, all of which are a function of upon the specific latitude and longitude of the agricultural field where the crop operations will be performed.

Academic and industrial research is going on continually to further quantify and calculate the effects of field operations. For example, when corn stover is left on an agricultural field, how does its form of deposition affect the soil? How do corn stobs of various heights above the ground affect soil? How does the length of chopped corn stalks deposited on the ground affect the soil? How does the use of particular corn variety (as opposed to another corn variety) affect the soil?

Governments have been addressing soil quality for over a century by providing agents to advise and educate farmers on best practices. More recently, governments have required farmers to follow certain practices in order to be eligible for government programs, such as crop insurance or farm subsidies.

In the United States, for example, agents of the Department of Agriculture in every state will help farmers assess the impact of their field operations on soil quality and soil erosion. Certain programs require that the farmer submit a farming plan for his entire crop cycle for assessment by a government agent.

The farming plan the farmer submits includes a list of all field operations (e.g. tillage, harvesting, chemical application) that he will conduct over the length of the crop cycle.

In this plan, the farmer lists the field operations and all relevant parameters (the tool used, the tool depth, the tool spacing on implement, chemicals applied and in what concentrations) as well as the specific date and specific location (i.e. the particular field) upon which he plans to do those field operations. The plan is defined on a per-field basis. Any operation he plans for a field he will perform over the entire field.

The agent then calculates, over the entire crop cycle, what the total soil effects will be for the entire field upon which the farming plan will be performed, whether the soil quality of that field will be increased, decreased or remain the same, and whether the soil in the field will be eroded or built up and by how much. Based upon this analysis the agent will either approve the farming plan for that field and thereby permit the farmer to participate in a specific government farming programs, or the agent will deny the farming plan for that field At this point the farmer should consider the farming plan, estimate what field operations (and what parameters of each field operation e.g. tool spacing, type of tool, tool depth, etc.) might be causing the adverse effects, revise his plan, reschedule another meeting with the agent, and the go over his revised farming plan with the agent.

The preparation for each meeting may take hours on the farmer's part and on the agent's part. These meetings are conducted for each farmer and each field in a agent's territory since almost all farmers participate in a one or another government program that requires an approved farming plan. They also constitute a significant portion of the agent's work during certain seasons of the year.

The agent typically makes many simplifying assumptions when he calculates the soil effects of a farming plan.

For example, a typical farm field may be categorized as having between three and ten distinct soil types in different regions of the field. Each of these soil types are defined as having different soil parameters that make each soil type more or less subject to soil erosion or a reduction of soil quality by field operations. Thus there are typically at least three to ten different regions for which the soil effects could be separately calculated. Determining the effects of soil quality on each of these different regions could easily require the agent to perform ten times as many calculations for each field—one for each soil type.

As another example, the terrain of a farm field typically varies continuously in its slope, slope length and curvature as one traverses the field. To perform all the calculations necessary to accommodate the continuously changing terrain in a farm field could increase the required calculations a hundredfold or even more.

For these reasons, a agent typically simplifies his computations of soil erosion and soil quality when analyzing the farming plan for that field. One simplifying practice an agent typically performs is characterizing each field by its dominant soil type. If, for example, a field is 60% Type X soil, 30% Type Y soil, and 10% Type Z soil, the agent may characterize the entire field as having Type X soil for purposes of his soil effects computations, and thus permit the farmer to perform field operations over the entire field (all soil types) that meet the government soil erosion and soil quality requirements of Type X soil.

If Type Y soil is not as prone to soil erosion and a reduction in soil quality, the approved farming plan for that field prevents the farmer from more aggressively farming the Type Y soil, thus reducing the productivity of the portions of the field comprised of type Y soil. This is true even if more aggressive farming would not harm the Type Y soil.

Similarly, it may be the case that Type Z soil is very sensitive to erosion and reductions in soil quality. The farmer, by following the approved farming plan for that field, may be farming the Type Z soil to aggressively and thus degrading its soil quality and causing unnecessary erosion.

Thus, by requiring the farmer to follow a single farming plan for an entire field comprised of several different soil types, some regions of the field may produce less crops them they can sustainably provide, and some regions of the field may be over farmed, and the soil damaged.

What is needed, therefore, is a system for determining soil effects of farming operations as the operations are occurring in the field. It is an object of this invention to provide such a system.

DETAILED DESCRIPTION

The term "map" as used herein, means digital data in the form of one or more maps, tables, arrays, strings, B-trees, or other digital data structures that are configured to be accessed using two- or three-dimensional coordinates (for example latitude, longitude, and elevation), and wherein the coordinates identify a location on the surface of the earth, and wherein the computer system accessing the map returns one or more numeric parameters.

The term "soil effect" as used herein means an effect on either the quantity or the quality of soil in an agricultural field due to environmental factors and farming practices. Soil effects include such things as soil erosion (soil loss), soil erosivity, carbon sequestration, and changes in the relative components that comprise the soil (clay, silt, sand, or organic matter).

The term "return rate" as used herein means a quantity of biomass that is temporarily separated from the ground during harvesting, and is subsequently returned to the ground.

The term "commanded return rate" as used herein means the return rate that is actually regulated by the agricultural harvester.

The term "field operation" refers to any practice actively performed in or on the soil of the field. It does not include naturally occurring events such as wind or precipitation.

The book "Revised Universal Soil Loss Equation Version 2" by George R, Foster of the National Sedimentation Laboratory, US Department of Agriculture (Agricultural Research Service), Oxford, Miss. (published thereby and available therefrom) is incorporated herein by reference for all that it teaches.

The various forms of digital soil data and databases referred to herein are published and can be found by contacting Soil Survey Staff, Natural Resources Conservation Service, United States Department of Agriculture. Soil Survey Geographic (SSURGO) Database. Available online at http://sdmdataaccess.nrcs.usda.gov/. (Accessed Oct. 15, 2014). They can also be found by contacting Soil Survey Staff, Natural Resources Conservation Service, United States Department of Agriculture. U.S. General Soil Map (STATSGO2). Available online at http://sdmdataaccess.nrcs.usda.gov/. (Accessed Oct. 15, 2014).

The text "Soil Taxonomy—A Basic System of Soil Classification for Making and interpreting Soil Surveys" (United States Department Of Agriculture, Natural Resources Conservation Service, second edition, 1999, Agriculture Handbook Number 436. Available online at http://www.nrcs.usda.gov/Internet/FSE_DOCUMENTS/nrcs142p2_051232.pdf.) Accessed Oct. 15, 2014) is incorporated herein for all that it teaches regarding soil characteristics, definitions, names, and parameters.

Figure 1:
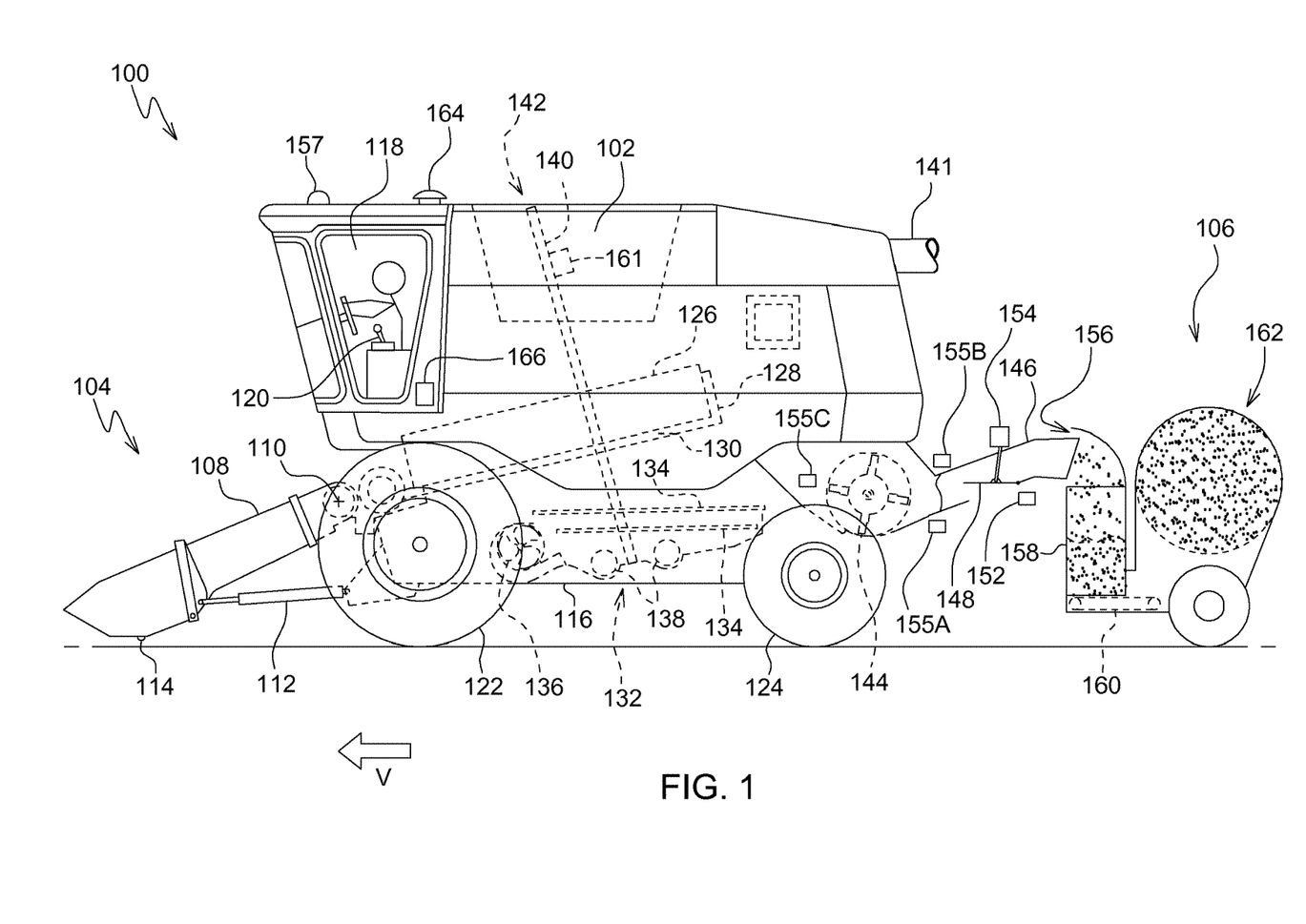
FIG. 1 is a side view of an agricultural harvester in accordance with the present invention.

Referring now to FIG. 1, an agricultural harvester 100 comprises an agricultural harvesting vehicle 102 to which an agricultural harvesting head 104 is coupled. A biomass accumulator 106 is coupled to the agricultural harvesting vehicle 102 at the rear of the agricultural harvesting vehicle 102.

The agricultural harvesting head 104 is supported on a feederhouse 108. The feederhouse 108 is pivotally supported on the front of the agricultural harvesting vehicle 102 to pivot up and down with respect to the ground about a pivotal axis 110. Actuators 112 are coupled to the agricultural harvesting vehicle 102 and the feederhouse 108 to raise and lower the feederhouse 108 with respect to the ground.

A header height sensor 114 is disposed to detect the distance between the header and the ground over which the agricultural harvesting vehicle 102 travels. As shown here, the header height sensor is supported on the agricultural harvesting head 104. In alternative arrangements, it may be supported on the feederhouse 108, or supported on the agricultural harvesting vehicle 102. The header height sensor 114 generates a signal indicative of the height of the agricultural harvesting head 104 with respect to the ground.

The agricultural harvesting vehicle 102 comprises a frame or chassis 116 to which the other elements of the agricultural harvesting vehicle 102 are fixed. An operator station 118 is provided at the front of the agricultural harvesting vehicle 102, and includes an operator input device 120 which can be manipulated by the operator to change various machine settings. The operator input device 120 may be configured as a knob, a lever, handle, switch, a touchscreen display, a keyboard, or other operator input device used in agricultural harvesting vehicles or configured to be coupled to digital microprocessors or microcontrollers.

The agricultural harvesting vehicle 102 further comprises two front wheels 122 and two rear wheels 124 disposed at the left front and right front of the agricultural harvesting vehicle 102 and the left rear and right rear of the agricultural harvesting vehicle 102. The wheels 122, 124 support the agricultural harvester 100 for travel over the field as it harvests crops.

The agricultural harvesting vehicle 102 further comprises a rotor 126 that extends generally longitudinally in the direction of travel "V" of the agricultural harvesting vehicle 102 as it travels through the field harvesting crops. The rotor 126 is disposed inside a concave 128 that extends substantially the entire length of the rotor 126.

Cut crop matter enters a gap 130 provided between the rotor 126 and the concave 128, and is threshed and separated therein into its constituent grain portion and biomass portion.

The agricultural harvesting vehicle 102 further comprises a cleaning shoe 132 that is disposed underneath the rotor 126 and the concave 128. The grain portion passes through apertures in the concave 128 together with smaller pieces of the biomass portion and fall onto sieves 134. Sieves 134 are provided in the cleaning shoe 132 to separate the grain portion from lighter biomass portion. A cleaning fan 136 is disposed at a forward end of the cleaning shoe 132 to receive air from its lateral ends and to transmit the air into the forward end of the cleaning shoe 132. This air has sufficient power to lift the smaller pieces of the biomass portion and carry them rearward and out of the agricultural harvesting vehicle 102. The grain portion, now clean, falls through the cleaning shoe 132 and into troughs 138 that extend laterally and horizontally across the agricultural harvesting vehicle 102 underneath the cleaning shoe 132. Grain falling into the troughs 138 is carried to one side of the agricultural harvesting vehicle 102 and into an elevator 140 which carries the grain upward and deposits it in a grain tank (or reservoir) 142. A yield sensor 161 is disposed at the elevator 140 and is configured to sense the grain yield as the grain passes through the elevator 140 and is carried upward to the grain tank.

Grain accumulates in the grain tank 142 and is periodically unloaded from the grain tank 142 through a laterally extending unloading conveyor 141 (shown partially cut away). Grain conveyed through the unloading conveyor 141 is carried into a grain cart or truck (not shown) that travels alongside the agricultural harvester 100 as the agricultural harvester 100 is being unloaded.

The biomass portion is carried rearward and is expelled from between the rotor 126 and the concave 128 at the rear of the agricultural harvesting vehicle 102. The biomass portion is then communicated to a biomass chopper 144 that extends laterally and horizontally across the rear of the agricultural harvesting vehicle 102. The biomass chopper 144 chops the biomass portion into smaller pieces that are projected rearward by the force of the chopper into a biomass conduit 146. A biomass gate 148 is provided in the biomass conduit 146 to vary the amount of flow in two directions. A first portion of the flow is directed rearward into the biomass accumulator 106. A second portion of the flow is selectively directed downward onto steering vanes 152. The second portion of the flow impacts the steering vanes 152 and is spread over the ground. The first portion of the flow is received into the biomass accumulator 106.

The biomass gate 148 is coupled to an actuator 154, which controls the relative position of the biomass gate 148 with respect to the biomass conduit 146. The actuator 154 can thereby vary the proportion of the biomass that is conveyed into the biomass accumulator 106 and the proportion of the biomass that is spread over the ground.

A first mass flow sensor 155A is provided to sense the flow rate of the biomass portion that is being spread upon the ground. A second mass flow sensor 155B is provided to sense the flow of biomass that is the biomass portion that is being gathered in conveyed to the biomass accumulator 106. A third mass flow sensor 155C is provided to sense the flow of the biomass portion prior to the floor of the biomass portion being separated into the biomass portion that is conveyed onto the ground and the biomass portion that is conveyed into the biomass accumulator 106.

In a first position, the actuator 154 drives the biomass gate 148 to convey all the biomass into the biomass accumulator 106. In a second position, the actuator 154 drives the biomass gate 148 to convey all of biomass on to the steering vanes 152 and thence to the ground. The actuator 154 is configured to drive the biomass gate 148 to a plurality of intermediate positions between the first position and the second position in which the relative proportions of biomass vary between the proportions of the first position and the second position.

The actuator 154 may be a rotary actuator or a linear actuator. It may be electrically actuated, hydraulically actuated, or pneumatically actuated.

The biomass gate 148 may be a single gate, or a plurality of gates. The plurality of gates may be driven by a single actuator or by multiple actuators. The biomass gate 148 may extend vertically and be pivoted about a vertical axis to split the biomass portion and send a portion to either side of the conduit, or it may be disposed vertically to steer crop material selectively upward and downward.

The biomass portion directed toward the biomass accumulator 106 by the biomass gate 148 travels out an open end of the biomass conduit 146 and is propelled into an opening 156 of a bin 158 disposed at the front of the biomass accumulator 106. Material entering the opening 156 falls to the bottom of the bin 158 and is received on conveyor 160 that is disposed to carry the biomass portion rearward and into an inlet of a baler portion 162 of the biomass accumulator 106.

The baler portion 162 of the biomass accumulator 106 is conventionally arranged to roll the biomass portion into a cylindrical shape and to then wrap and secure it with a mesh, fabric or film for subsequent deposit upon the ground. In an alternative arrangement, the baler portion 162 is a square baler.

A position indicator system 164 is mounted on the agricultural harvester 100 to provide a signal indicative of the position of the agricultural harvester 100 in the agricultural field being harvested. The position indicator system 164 may comprise a satellite navigation receiver. It may also comprise a dead reckoning system. The position indicator system 164 may be responsive to radio signals transmitted by satellites, including satellites of the GPS system, the Glonass system, or other satellite navigation system. The position indicator system 164 may also be responsive to short range radio signals transmitted from radio transmitters located closer to the agricultural harvester 100, for example from regional or local radio transmitters (e.g. differential GPS, DGPS, NDGPS, or WADGPS) that provide correction factors for satellite navigation transmitters. The short range radio signals may be transmitted from the dedicated local radio transmitter, or may be relayed to the agricultural harvesting vehicle in 102 using cell phone radio transmitters (e.g. transmitters on cell phone towers).

A control system 166 is provided on the agricultural harvesting vehicle 102 to vary the position of the biomass gate 148. It does this by controlling the position of actuator 154. Actuator 154, in turn, controls the position of biomass gate 148. The control system 166 is configured to receive signals from local and/or remote data sources, including data from the position indicator system 164. Based upon those signals, the control system 166 determines the effect of biomass removal on the soil (i.e. soil effects). The soil effects determined by the control system 166 include effects on soil quality and/or effects on soil erosion. The control system 166 is further configured to control the position of biomass gate 148 in response to the determination of soil effects in such a manner that the soil effects of biomass removal do not exceed a predetermined threshold soil effect. This threshold soil effect may include a threshold soil quality effect and/or a threshold soil erosion effect.

The control system 166 includes one or more electronic control units (ECUs) 168. In the discussion below, the control system 166 will be illustrated as comprising a single ECU.

Alternative configurations include a plurality of ECUs that are joined together over a communications link to transmit data between them. This communications link may include one or more of a serial communications bus (for example a CAN bus), a parallel communications bus, Wi-Fi, Bluetooth, MiFi, a cell telephone network, optical fibers. In the discussion below, the description of the capabilities and functionality of the ECU can be distributed in between any of the individual ECUs that comprise the control system 166.

Figure 2:
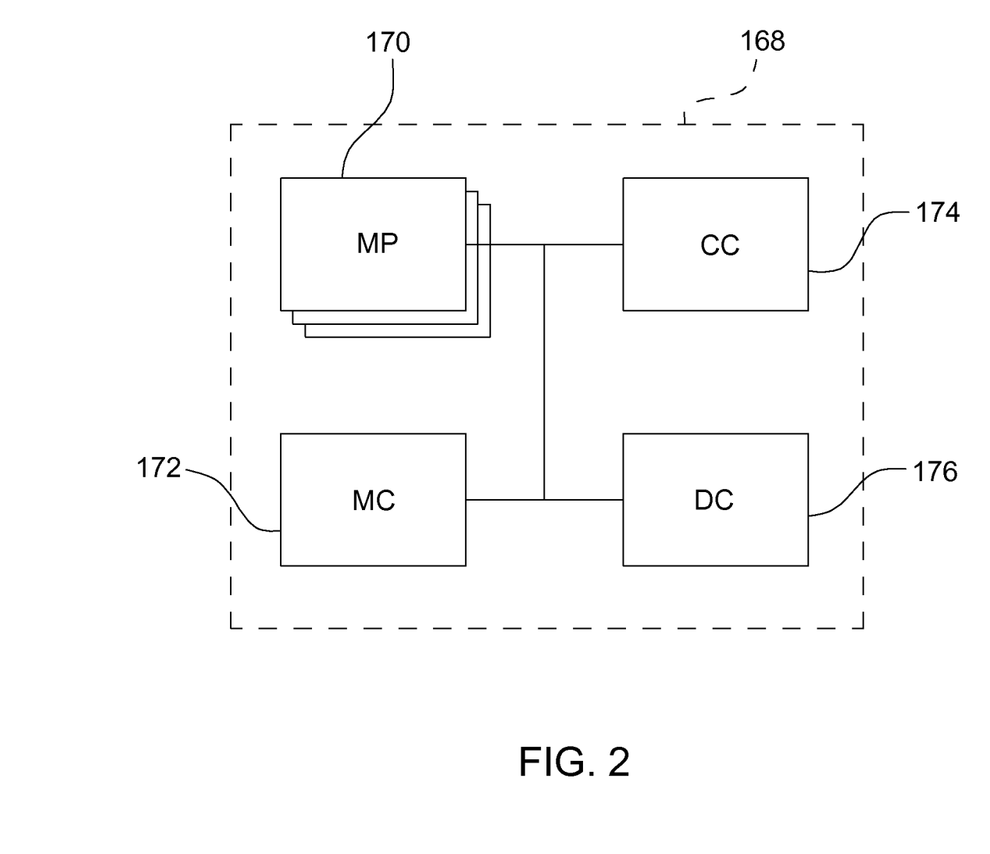
FIG. 2 is a schematic view of an ECU of the FIG. 1 in accordance with the present invention.

FIG. 2 illustrates a typical arrangement of an ECU 168. The ECU 168 comprises a digital microprocessor 170, memory circuits 172, a communication circuit 174, and a driver circuit 176. Digital microprocessor 170 is coupled to memory circuits 172 to bidirectionally communicate data stored in memory circuits 172, and to retrieve instructions are executed the digital microprocessor 170.

The memory circuits 172 store digital instructions that are executed by the digital microprocessor 170 to control its operation, its calculations, and its interactions with other devices (including the additional ECUs mentioned above). The memory circuits 172 also store preliminary numeric values that are calculated by the digital microprocessor 170. The digital microprocessor 170 is configured to retrieve these parliamentary numeric values and use them in further calculations that are performed by the digital microprocessor 170. The memory circuits 172 may comprise static memory circuits (e.g. ROMs, PROMs, EPROMS, EEPROMS, ASICs and the like). Memory circuits 172 may comprise volatile memory circuits (e.g. RAM). The memory circuits may be coupled to the digital microprocessor 170 via a data bus and address bus. The memory circuits 172 may be coupled to the digital microprocessor 170 indirectly via an intermediate communications circuit (e.g. an IDE controller, a SASI controller, or a USB controller). In one arrangement, the memory circuits 172 are formed integrally with the digital microprocessor 170. In another arrangement, the memory circuits 172 are located on a separate physical device that is coupled to the digital microprocessor 170 via intermediate circuits.

The communication circuit 174 is configured to permit the microprocessor to communicate with other devices outside the ECU (e.g. operator input devices, operator displays, the position indicator system 164, and other ECUs). The communication circuit 174 may include radio communication circuits configured to communicate with other devices using radio transmissions, electrical communication circuits configured to communicate with other devices using electrical conductors, or optical communication circuits configured to communicate with other devices using optical signals.

In the arrangement of FIG. 2, a single digital microprocessor 170 is illustrated for convenience of illustration. It should be understood that multiple digital microprocessors 170 may be provided in place of the single digital microprocessor 170. Further, each of the digital microprocessors 170 may include more than one core.

Figure 3:
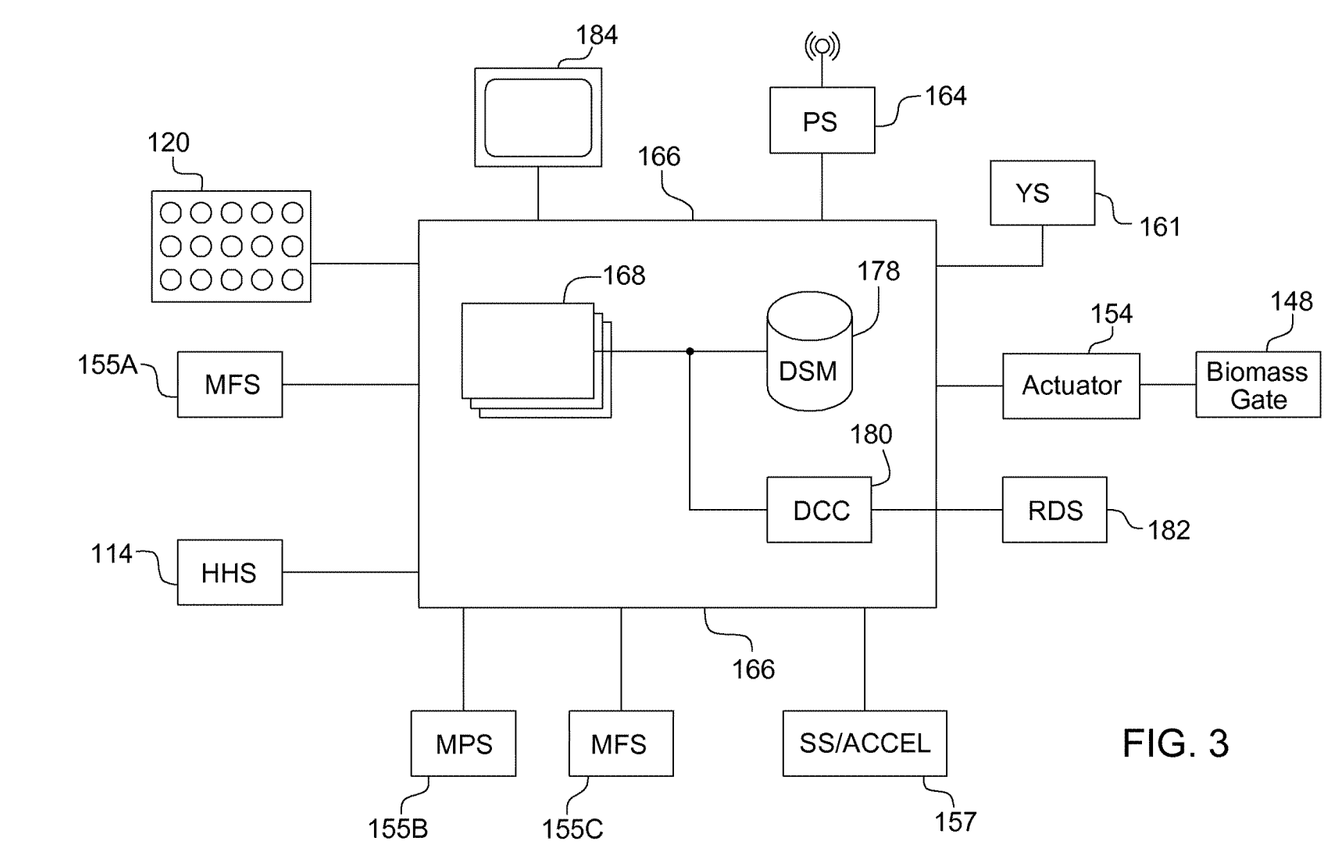
FIG. 3 is a schematic diagram of a control system using the ECU of FIG. 1 of the agricultural harvester of FIG. 1.

FIG. 3 illustrates the control system 166. The control system 166 comprises one or more ECUs 168, data storage media 178, and a data communication circuit 180. The data storage media 178 comprises memory circuits that store data. These memory circuits also store data retrieved by the data communication circuit 180. The data communication circuit 180 is configured to communicate with and receive data from a remote data storage device 182. The data communication circuit 180 may be configured to communicate with the remote data storage device 182 in a variety of ways. First, the data communication circuit 180 may be connected directly to a remote data storage device 182. For example, the remote data storage device 182 may comprise memory circuits (e.g. RAM, ROM, solid-state disk drives, or hard disks) that store data electrically. The remote data storage device 182 may comprise optical storage devices (e.g. CDs or DVDs).

The control system 166 is coupled to an operator display 184 that is disposed in the operator station 118. The control system 166 is also coupled to an operator input device 120 that is also disposed in the operator station 118. The operator display 184 may be an LCD, CRT or other display device. The operator input device 120 may be a lever, knob, dial, keyboard, touch screen, button or buttons, joystick, mouse, trackball, or other device configured to interface with an ECU. The control system 166 is also coupled to the actuator 154, which is in turn is coupled to and drives the biomass gate 148. The control system is also coupled to the position indicator system 164 to receive signals therefrom that indicate the position of the agricultural harvester 100 in the agricultural field being harvested.

The control system 166 is also coupled to the yield sensor 161 to receive a signal indicative of the crop yield of the grain portion at the agricultural harvester's location in the field. Control system 166 is configured to save the crop yield of the grain portion as a map in the memory circuits of the control system 166.

Process Description

Figure 4:
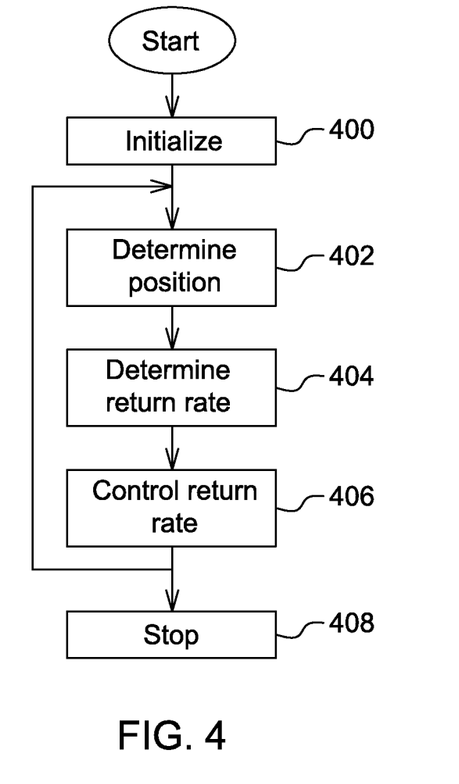
FIGS. 4-12 are flow charts of the programmed process followed by the control system of FIG. 4.

FIG. 4 illustrates a flow chart of the process performed by (and upon) the control system 166.

In step 400 the control system 166 is initialized. Initialization includes the steps of storing in a memory circuit of the control system 166 digital data that indicates field management practices performed on the field being harvested. These field management practices can indicate supporting practices performed on the field, crop rotations that are planned for the field, and field operations that will be performed on the field. Initialization may also include storing in a memory circuit of the control system 166 digital data indicative of a desired return rate of biomass in the form of a map.

In step 402 the control system 166 determines the position of the agricultural harvester 100 in the field. To determine the position of the agricultural harvester 100 in the field, an ECU 168 in the control system 166 is configured to communicate with the position indicator system 164 and receive signals indicative of the position of the agricultural harvester in the field. The control system 166 performs any additional processing necessary to determine at least a two dimensional location of the agricultural harvester 100 within the field using a standard coordinate system such as the latitude and longitude. In an alternative configuration, the control system 166 performs any additional processing necessary to determine the two dimensional location of the agricultural harvester 100 within the field and also the elevation of the agricultural harvester 100 with respect to a standard altitude. The control system 166 is further configured to save this two or three dimensional location in one of the memory circuits of the control system 166.

In step 404 the control system 166 determines a return rate of biomass to the field. The control system 166 calculates the return rate from the digital data provided to the control system 166 in the initialization step (step 400) and the position determined by the control system 166 in step 402. It can also receive data regarding dynamic conditions that change from location to location in the field and calculate the return rate determination upon that. Such dynamic data includes data indicative of crop yield provided by the yield sensor 161.

In step 406, the control system 166 controls the return rate of biomass to the field. The control system 166 controls the return rate by driving the actuator 154, which in turn controls the position of the biomass gate 148. The control system 166 varies the relative proportion of the biomass sent to the biomass accumulator 106 and the biomass spread on the ground by varying the position of the biomass gate 148.

During the harvesting process (i.e. when the agricultural harvester 100 travels through the agricultural field harvesting crops), the control system 166 repeatedly executes a loop comprising step 402, step 404, and step 406. The loop is executed every 1-30 seconds during harvesting process.

When the operator ceases to harvest crops, the control system 166 terminates FIG. 4 process in step 408.

Initialization Details (Step 400)

Figure 5:
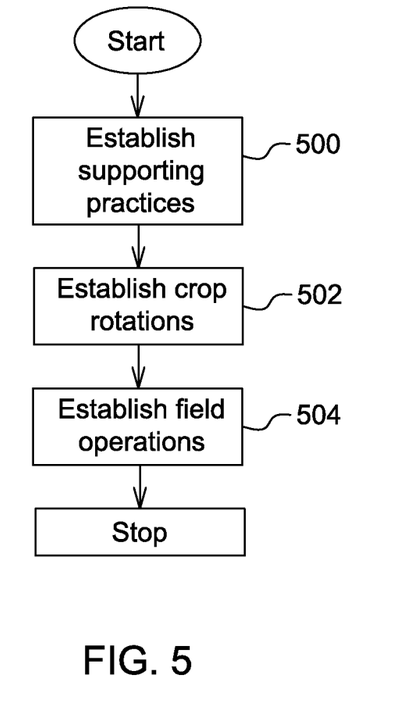

FIG. 5 illustrates a flowchart of the process performed by the control system 166 during initialization (step 400) in which the field management practices are established for the field being harvested.

In step 500, the control system 166 receives data indicative of supporting practices performed on the field. The supporting practices that are established include data indicative of whether the field is strip farmed (i.e. the field is divided into strips of one crop that are alternated with strips of another crop), and whether the field is ridge farmed (i.e. whether the field is provided with upraised ridges that extend through the field).

In step 502, the control system 166 receives data indicative of crop rotations (if any) performed on the field. The crop rotations that are established comprise the identity of the different crops that are planted in successive years (e.g. Crop 1 in Year 1, Crop 2 in Year 2, Crop 3 in Year 3). It should be noted that not all fields will be rotated between two or more crops. The same crop may be planted in the field every year. In this limiting case, a crop rotation cycle would be one (1) year. A crop rotation will also include any year in which the field lies fallow (e.g. Crop 1 in Year 1, fallow in Year 2, etc.).

In step 504, the control system 166 receives data indicative of field operations performed on the field. The field operations that are established comprise all of the operations performed on the soil or the crops of the field in all the years of the crop rotation. Typical field operations that are established include tilling the field, planting the field, fertilizing the field, spreading of herbicides on the field, and spreading of pesticides on the field. Establishing the field operations also comprises establishing the particular date (estimated or actual) at which each field operation will occur. Establishing field operations also includes establishing the type of machine that will perform these operations, and the particular way in which each of these machines is configured and interacts with the soil. For example, a field operation of the tillage type can include the type of tillage to be performed (e.g. ripping, disking, raking, or harrowing), and, if the implement is not uniquely identified by the name of the tool, the field operation can identify the individual tools that will perform the tillage (e.g. a disk, rake, harrow, ripper), the spacing on the implement of the individual tools that engage the soil, as well as any variable settings of the implement or individual tools such as soil penetration depth of the individual tools.

Determining the Return Rate (Step 404)

Figure 6:
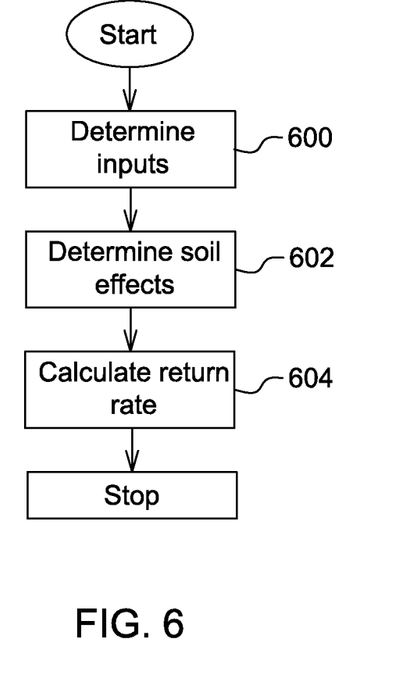

FIG. 6 illustrates a process of determining the return rate. This process can be performed dynamically on the vehicle (as described herein) by the control system 166, or portions of it can be performed remotely prior to the agricultural harvester 100 entering the field. In the case the process is performed remotely, the return rate can be calculated and stored as one or more maps in the memory circuits of the control system 166 and downloaded during initialization (step 400).

In step 600, the control system 166 determines the inputs (in the form of digital data) used to calculate the return rate. These inputs include data regarding the climate of the field, farming activities performed in or on the field, the topography of the field, and the composition of soil in the field. This process is described in more detail in conjunction with FIG. 7, below. These may include dynamic data that change as the field is harvested, such as the crop yield.

In step 602, the control system 166 calculates the soil effects at the position in the field of the agricultural harvester 100 based upon the inputs (from step 600) determined for the position in the field of the agricultural harvester 100.

In step 604, the control system 166 calculates the return rate based upon the soil effects determined in step 602. If the control system 166 determines that the return rate calculated in step 602 meets threshold soil effect requirements (i.e. meets threshold value of any one of or all of the soil effects), then the control system 166 sets the commanded return rate equal to the preliminary return rate (from step 602).

Figure 7:
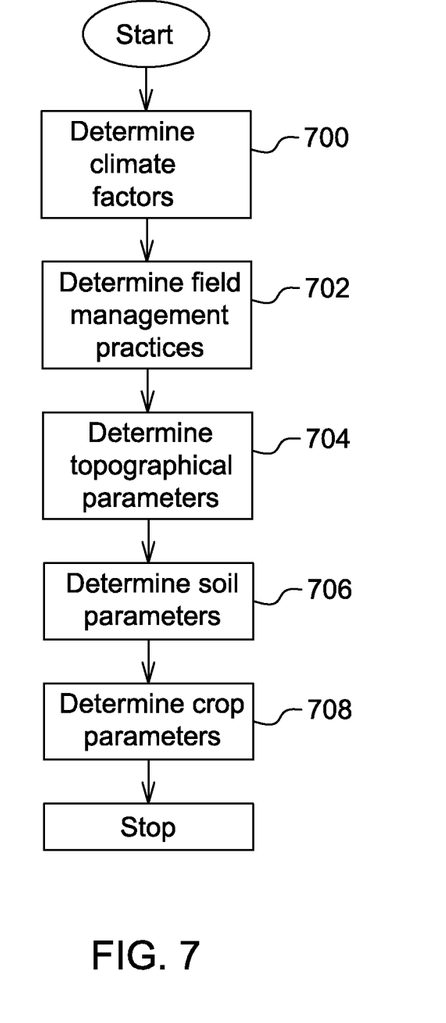

FIG. 7 illustrates the process of determining the inputs (step 600).

In step 700, the control system 166 determines the climate factors for the field to be harvested. The climate factors comprise climate data indicative of the outside air temperature, the rainfall or other precipitation, and the wind speeds that will be experienced (or have been experienced previously) by the field to be harvested. The outside air temperature, the precipitation, the precipitation intensity, and the wind speed can be determined as a function of a particular day in the year, a particular week in the year, or a particular month in the year. In the United States, one arrangement of these data has been recorded in the form of an electronic vector map for the entire surface area of the United States and is called "Crop Management Zones" (CMZ). Publicly accessible digital maps of CMZs that are usable by the control system 166 are maintained by the United States Department of Agriculture and are available at the Natural Resources Conservation Service of the USDA at http://www.nrcs.usda.gov.

Typically, an agricultural field will lie within a single CMZ, and therefore the climate factors can be identified by the CMZ identifier for that field. In this case, the control system 166 will retrieve the CMZ identifier for the field in step 700.

Alternatively, the field may be covered by more than one CMZ, in which case a map of the CMZs in the field are stored in the memory circuits of the control system 166, and the control system 166 is configured to use the position of the agricultural harvester 100 in the field to look up and retrieve the appropriate CMZ from the map of the CMZs. In another arrangement, maps of each climate factor can be maintained in the memory circuits of the control system 166 as a function of the position of the agricultural harvester in the field, and the control system is configured to use the position of the agricultural harvester 100 in the field to look up and retrieved the appropriate climate factors for the position of the agricultural harvester 100 in the field.

In step 702, the control system 166 determines the field management practices that have been performed or will be performed in the field to be harvested over the crop rotation. In initialization (step 400) the field management practices for the field were established by the control system 166. In step 702, the control system 166 retrieves these field management practices from its memory circuits. The process for determining the field management practices is provided in more detail below in conjunction with FIG. 8.

The field management practices may be constant over the entire field. In which case, the management practices are saved in the memory circuits of the control system 166 for the entire field and are retrieved by the control system 166.

The field management practices may vary based upon the position of the agricultural harvester 100 in the field. In which case, the management practices are saved in the memory circuits of the control system 166 as maps, and the control system 166 is configured to use the position of the agricultural harvester 100 in the field to look up and retrieve the appropriate field management practices to be performed on the soil at the position of the agricultural harvester 100 in the field.

For example, the field management practices may include a previous or future field operation of tilling, and the depth of the tilling may vary based upon the position of the agricultural harvester 100 in the field. As a further example, the field management practices may include a field operation of fertilizing, or applying pesticides, or applying herbicides. The application rate of the fertilizer, pesticides or herbicides may vary as a function of the location of the agricultural harvester 100 in the field. It should be noted that field operations include field operations that are performed at any time during the crop rotation, and therefore will comprise field operations that are planned to occur in the future, or field operations that have occurred in the past.

In step 704, the control system 166 determines the topographical parameters of the agricultural field. The topographical parameters of the agricultural field comprise one or more factors indicative of the geographical contours of the surface of the agricultural field. In particular, the topographical parameters comprise the slope, and the slope length. The topographical parameters also comprise the elevation, the curvature, and the slope profile.

Some or all of the topographical parameters may be constant over the entire field. In this case, the topographical parameters are saved in the memory circuits of the control system 166 for the entire field and are retrieved by the control system 166.

Some or all of the topographical parameters may vary based upon the position of the agricultural harvester 100 in the field. In this case, the topographical parameters are saved in the memory circuits of the control system 166 as maps, and the control system 166 is configured to use the position of the agricultural harvester 100 in the field to look up and retrieve the appropriate topographical parameters of the surface of the field at the position of the agricultural harvester 100 in the field. Thus, the memory circuits of the control system 166 may include maps of one or more of the slope, the slope length, the elevation, the curvature, and the slope profile of the field as a function of the position of the agricultural harvester 100 in the field. The process for determining the topographical parameters is described in more detail in conjunction with FIG. 9 below.

In step 706, the control system 166 determines the soil parameters of the agricultural field. The soil parameters include soil composition parameters, which comprise the percent of clay, the percent of sand, the percent of silt, and the percent of organic matter in the soil. Soil composition parameters may also comprise the pH of the soil and the soil K factor. Some or all of the soil parameters may vary based upon the position of the agricultural harvester 100 in the field. In this case the soil parameters are saved in the memory circuits of the control system 166 as maps, and the control system 166 is configured to use the position of the agricultural harvester 100 in the field to look up and retrieve the appropriate soil parameters of the soil at the position of the agricultural harvester 100 in the field. One process for determining the soil parameters is described in more detail in conjunction with FIG. 10 herein.

In step 708, the control system 166 determines the crop parameters of crops harvested from the agricultural field. The crop parameters include crop harvesting rates or crop "yield" (e.g. volume per unit area of the field or weight per unit area of the field. "Crop" as used in step 708 refers to any portion of the crop plants being grown (or planned to be grown in the future, or grown in the past) in the field, which include grain, fruit, stover, cobs, stalks, branches, fruit, or leaves). The process for determining the soil parameters described in more detail in conjunction with FIG. 11.

Figure 8:
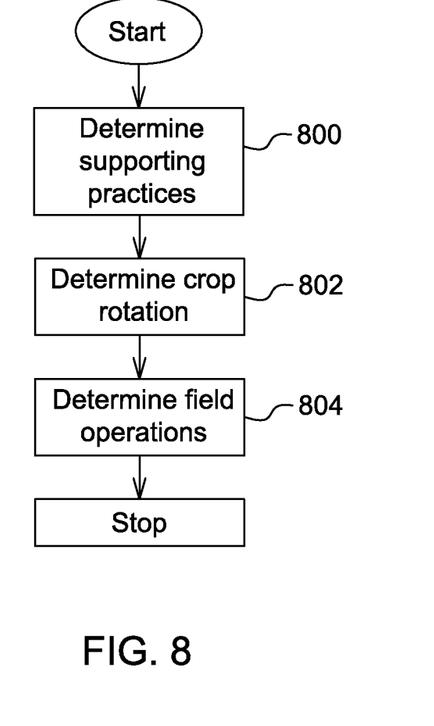

Determining the Field Management Practices (Step 702):

FIG. 8 illustrates a process of determining the field management practices.

In step 800, control system 166 determines the supporting practices that are performed on (or in) the field. The control system 166 is configured to retrieve the supporting practices previously established in step 500 and to save them in a memory circuit associated with control system 166.

In step 802, control system 166 determines the current crop rotation that is planned for the field. The control system 166 is configured to retrieve the supporting practices previously established in step 502, and to save them in a memory circuit associated with control system 166.

In step 804, control system 166 determines the field operations that are planned for the field. The control system 166 is configured to retrieve the field operations previously established in step 504, and to save them in a memory circuit associated with control system 166.

Figure 9:
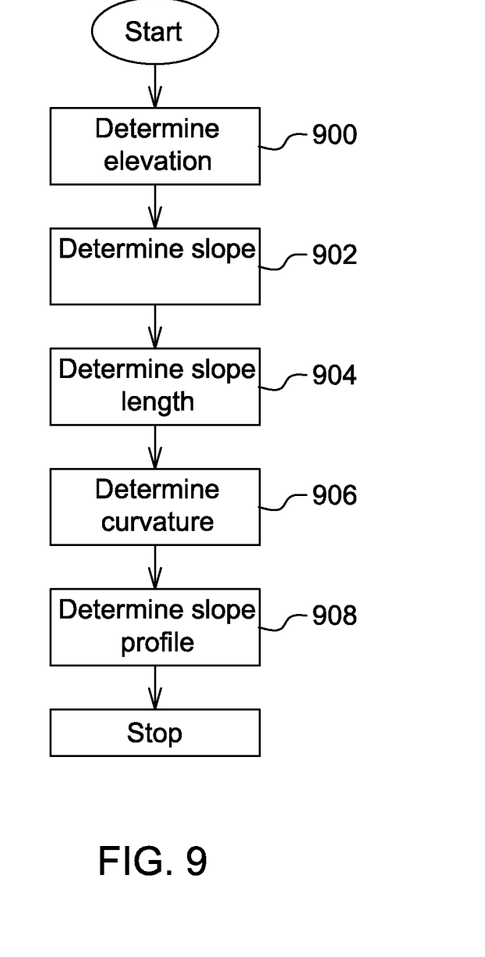

Determining the Topographical Parameters (Step 704):

FIG. 9 illustrates the process of determining the topographical parameters.

In step 900, the control system 166 determines the elevation of the field for the position of the agricultural harvester 100. In one arrangement, the elevation of the field is stored in a map that is stored in the memory circuits associated with the control system 166. Alternately, the control system 166 is configured to determine the elevation of the field at the location of the agricultural harvester 100 using vertical position data determined in step 402. In an alternative arrangement, the control system 166 is configured to determine the elevation of the field at the location of the agricultural harvester 100 by using a signal from a barometric pressure sensor and the calculating the elevation based upon the barometric pressure sensor signal using standard models of atmospheric pressure variation as a function of height.

In step 902, the control system 166 determines the slope of the field for the position of the agricultural harvester 100. In one arrangement, the slope of the field is stored in a map that is stored in the memory circuits associated with the control system 166. Alternatively, the control system 166 is configured to determine the elevation of the field at the location of the agricultural harvester 100 using a signal from a slope sensor 157. The slope sensor 157 is preferably an accelerometer configured to provide an acceleration signal indicating the slope of the agricultural harvester 100 with respect to a two-dimensional horizontal plane.

In step 904, the control system 166 determines the slope length of the field at the position of the agricultural harvester 100. In one arrangement, the slope length in the field is stored in a map that is stored in the memory circuits associated with control system 166. In an alternative arrangement, the control system 166 is configured to determine the slope length of the field at the location of the agricultural harvester 100 using vertical position data determined in step 402. In an alternative arrangement, the control system 166 is configured to determine the slope of the field at the location of the agricultural harvester 100 by retrieving elevation data stored in the elevation map, determining the direction of steepest ascent, and determining the length of the steepest ascent using standard topographical algorithms.

In step 906, the control system 166 determines the curvature of the field at the position of the agricultural harvester 100. In one arrangement, the curvature is stored in a map that is stored in the memory circuits associated with the control system 166. In this arrangement, the control system 166 looks up the curvature for the position of the agricultural harvester 100 in the field using the position data determined in step 402.

In step 908, the control system 166 determines the slope profile of the field at the position of the agricultural harvester 100. In one arrangement the slope profile is stored in a map that is stored in the memory circuits associated with the control system 166. In this arrangement, the control system 166 looks up the slope profile of the field at the position of the agricultural harvester 100 in the field using the position data determined in step 402.

Determining the Soil Parameters (Step 706)

Figure 10:
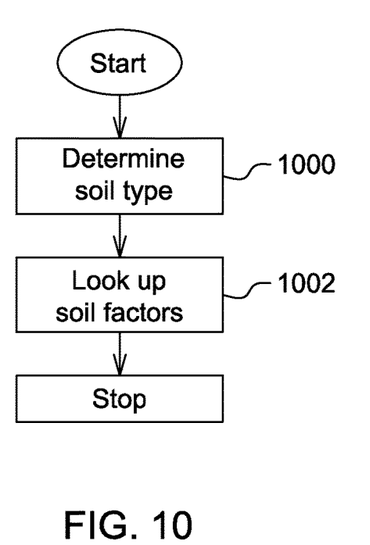

FIG. 10 illustrates one process of determining the soil parameters.

In step 1000, the control system 166 determines the soil type of the soil at the location of the agricultural harvester 100 in the field. A map of soil types is stored in a memory circuit of the control system 166 for this purpose and is accessed using the location of the agricultural harvester in the field previously determined in step 402.

In step 1002, The control system 166 uses the determined soil type to access a table of soil map units. For each soil type, there is a corresponding soil map unit in the table. Each soil map unit defines a corresponding set of soil parameters for soils corresponding to the soil type of the soil at the location of the agricultural harvester 100 in the field. The soil parameters are stored in tables in a soil database. The soil database is also stored in memory circuits of control system 166. One arrangement by which the control system 166 retrieves these soil parameters will be described in more detail below in conjunction with FIG. 14.

Determining the Crop Parameters (Step 708)

Figure 11:
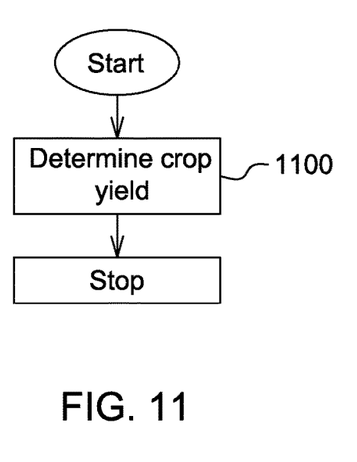

FIG. 11 illustrates a process of determining the crop parameters.

In step 1100, the control system 166 determines the crop yield at the location of the agricultural harvester 100 in the field. The crop yield in step 1100 refers to the yield of any portion of the crop plant, including grain and biomass.

In one arrangement, the control system 166 is configured to read the yield sensor 161 which provides a signal indicative of the crop yield at the position of the agricultural harvester 100 in the field.

In a second arrangement, the control system 166 is configured to retrieve a crop yield indicative of the average crop yield of the whole field by retrieving the crop yield from a memory circuit of the control system 166.

In a third arrangement, the control system 166 is configured to retrieve a grain yield indicative of the grain yield at the position of the agricultural harvester 100 in the field by accessing a grain map that was previously stored in a memory circuit of the control system 166. This grain map is stored in a memory circuit of the control system 166 during initialization (step 400).

Determining Soil Effects (step 602)

Figure 13:
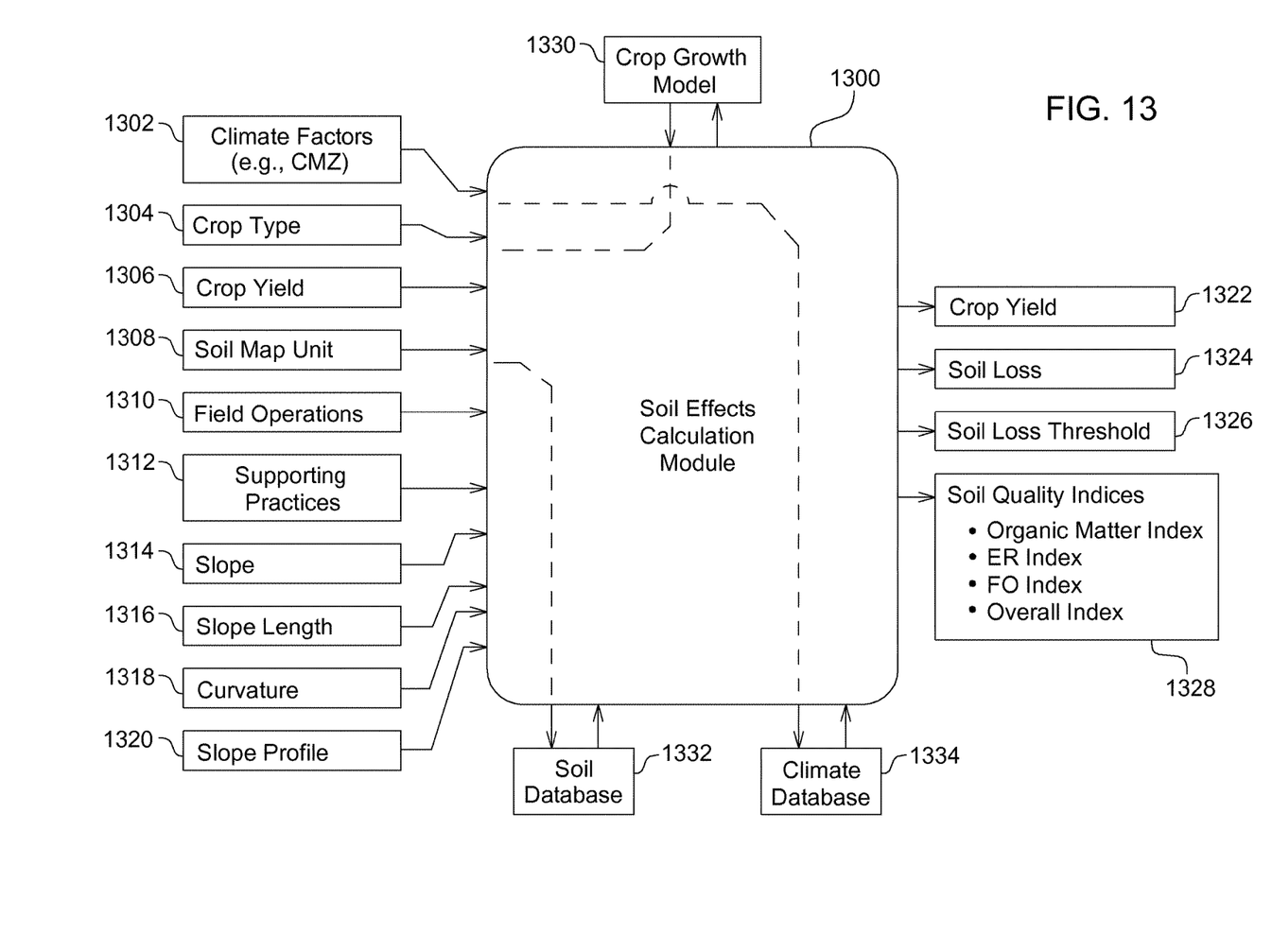
FIG. 13 is a schematic diagram of a preferred software arrangement of the control system of FIG. 4.

FIG. 13 illustrates one configuration of the control system 166 that enables the control system 166 to calculate soil effects (step 602). In particular, FIG. 13 illustrates a soil effects calculation module 1300 that can be stored in one of the memory circuits of control system 166 and be retrieved to be executed by one or more of the ECUs 168 of the control system 166.

A preferred soil effects calculation module 1300 in this configuration comprises a dynamic linking library (DLL) (e.g. computer program). A preferred soil effects calculation module 1300 used herein is available for download at http://fargo.nserl.purdue.edu/RUSLE2_ft/ RUSLE2_Program_File/ (accessed Oct. 15, 2014), or http://fargo.nserl.purdue.edu/rusle2_dataweb/ RUSLE2_Index.htm (accessed Oct. 15, 2014).

The soil effects calculation module 1300 is configured to receive as inputs:

1. The Crop Management Zone (CMZ) 1302 determined in step 700 for the position of the agricultural harvester 100 in the field determined in step 402.
2. The crop type (or types) 1304 determined in step 802 for the position of the agricultural harvester 100 in the field determined in step 402.
3. The crop yield 1306 determined in step 1100 for the position of the agricultural harvester 100 in the field determined in step 402.
4. The soil map unit 1308 determined in step 1002 for the position of the agricultural harvester 100 in the field determined in step 402.
5. The field operations 1310 determined in step 804 for the position of the agricultural harvester 100 in the field determined in step 402.

6. The supporting practices 1312 determined in step 800 for the position of the agricultural harvester 100 in the field determined in step 402.
7. The slope 1314 determined in step 902 for the position of the agricultural harvester 100 in the field determined in step 402.
8. The slope length 1316 determined in step 904 for the position of the agricultural harvester 100 in the field determined in step 402.
9. The curvature 1318 determined in step 906 for the position of the agricultural harvester 100 in the field determined in step 402.
10. The slope profile 1320 determined in step 908 for the position of the agricultural harvester 100 in the field determined in step 908.

The soil effects calculation module 1300 is configured to generate the following outputs:
1. The crop yield 1322 at the position of the agricultural harvester 100 in the field determined in step 402.
2. The soil loss 1324 at the position of the agricultural harvester 100 in the field determined in step 402.
3. The soil loss threshold 1326 at the position of the agricultural harvester 100 in the field determined in step 402.
4. The soil quality indices 1328 at the position of the agricultural harvester 100 in the field determined in step 402, the soil quality indices 1328 including an organic matter (OM) index, an erosion (ER) index, a field operations (FO) index, and an overall soil quality index.

Other Data Accessed by the Soil Effects Calculation Module 1300

The soil effects calculation module 1300 that is executed by the control system 166 is in communication with a crop growth model 1330, soil database 1332, and a climate database 1334. These databases may be stored in the memory circuits of the control system 166.

The crop growth model 1330 includes factors that indicate how the type of crops indicated by crop type 1304 grow (i.e. the crop grown in the field), and thus how much biomass the crop creates.

The climate database 1334 stores the climate data for each CMZ through which the agricultural harvester 100 will travel as it harvests the field. This data is provided to the soil effects calculation module 1300 such that when the soil effects calculation module 1300 executed by the control system 166 receives a CMZ 1302, it retrieves the appropriate climate data for the field from the climate database 1334 automatically. The climate database 1334 includes a daily time series of typical climactic conditions (amount of precipitation, type of precipitation (hail, sleet, rain, snow), precipitation intensity, air temperature, wind speed, wind direction, etc.). The climate data has been gathered and compiled from historical data accumulated over a period of years.

The soil database 1332 stores the soil parameters. These soil parameters are stored in the soil database 1332 such that the soil effects calculation module 1300 can use the soil map unit 1308 as a key to retrieve the soil factors (discussed above regarding step 1000 and step 1002).

The soil effects calculation module 1300 executed by the control system 166 receives the inputs (CMZ 1302, crop type 1304, crop yield 1306, soil map unit 1308, field operations 1310, supporting practices 1312, 1314, slope length 1316, curvature 1318, and slope profile 1320), uses these inputs to look up specific soil, climate, and crop growth data in the databases (crop growth model 1330, soil database 1332, and climate database 1334) and determines the soil effects (crop yield 1322, soil loss 1324, soil loss threshold 1326, and soil quality indices 1328).

The calculation using the soil effects calculation module 1300 is forwardly calculated. In other words, it cannot directly use soil effects (crop yield 1322, soil loss 1324, soil loss threshold 1326, soil quality indices 1328) as inputs in its calculations in combination with other identified inputs (CMZ 1302, crop type 1304, crop yield 1306, soil map unit 1308, field operations 1310, supporting practices 1312, 1314, slope length 1316, curvature 1318, and slope profile 1320) and from that determine the rate at which biomass can be removed from the soil, or the rate at which biomass should be left on the soil.

The return rate cannot therefore be back calculated directly by the soil effects calculation module 1300. Instead, the control system 166 is configured to assume a trial or test return rate as one of the several inputs and then to execute the soil effects calculation module 1300 to determine the soil effects due to that test return rate. If the control system 166 determines that the soil effects using the test return rate are bad (i.e. the control system 166 determines that they exceed certain predetermined soil effect thresholds) then the control system is configured to test return rate using it as an input and repeat the calculations by the soil effects calculation module 1300.

In one arrangement, the control system 166 is configured to execute the programmed instructions in the soil effects calculation module 1300 starting with an initial biomass removal rate of zero (i.e. a 100% return rate of biomass to the soil) and iteratively repeat this calculation increasing the amount of biomass removed from the soil (i.e. iteratively reduce the biomass return rate below 100%) on each iteration until the outputs of the soil effects calculation module 1300 indicates that the soil effects exceed a predetermined threshold or fall outside an acceptable range (i.e. either the soil loss exceeds a predetermined soil loss threshold or the soil quality indices fall below a predetermined soil quality threshold). When this happens, the control system 166 will select the last acceptable return rate of biomass to the soil as the calculated return rate (see step 604).

The soil effects calculation module 1300 thereby repeatedly performs step 600 (in which an iteratively changing removal rate is one of the inputs), then step 602 and then step 604 of FIG. 6 until a maximum biomass removal rate (i.e. a minimum biomass return rate) has been determined. At this point the control system 166 returns to control the return rate of biomass to the soil.

Figure 12:
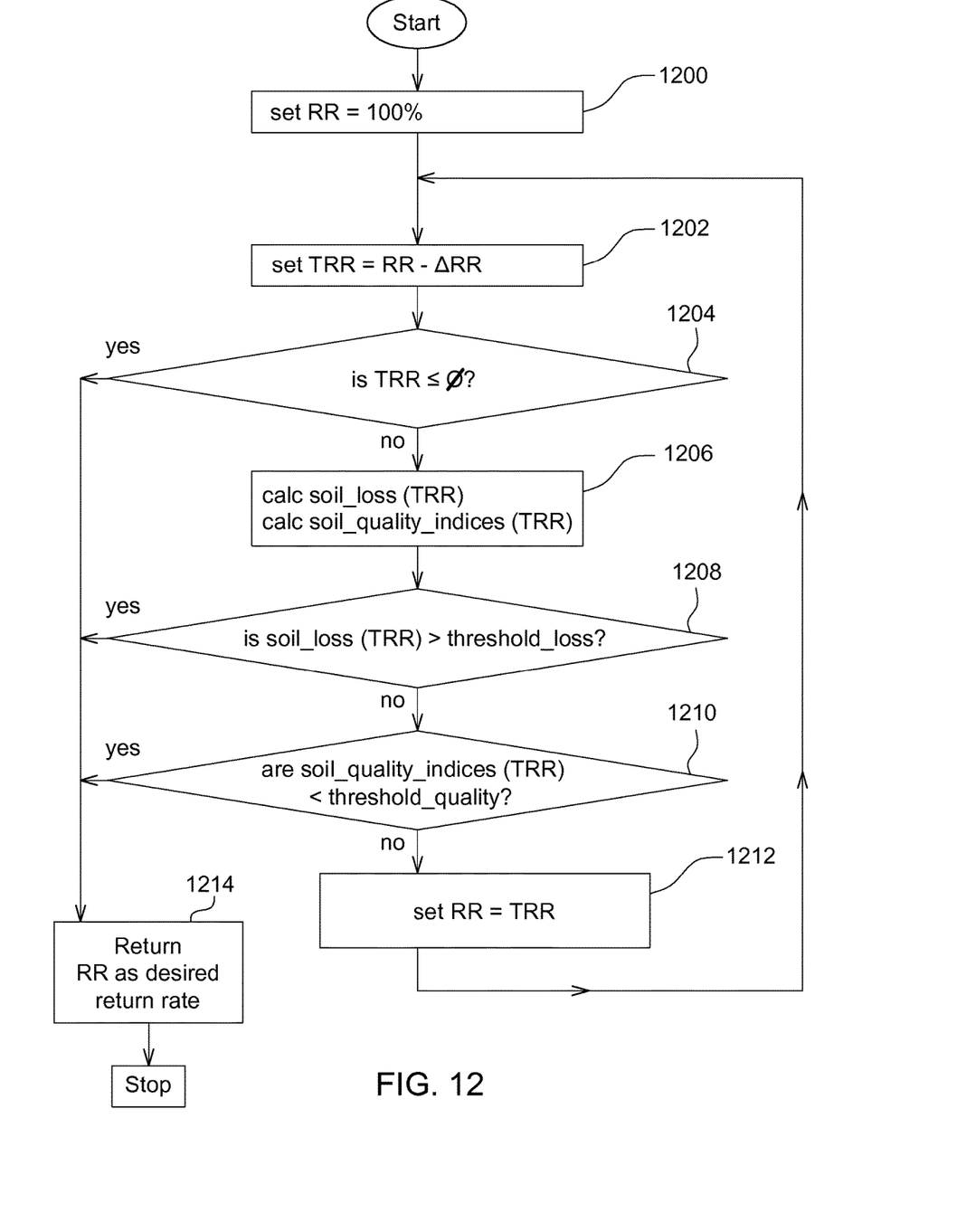

This process of iteratively reducing the return rate of biomass to the soil until a threshold soil quality and a threshold soil loss are reached is illustrated in FIG. 12.

In step 1200, the control system 166 sets the biomass return rate (RR) at 100%. This is the lowest possible rate of biomass removal and equals a biomass removal rate of zero and continues to step 1202.

In step 1202, the control system 166 reduces the return rate (RR) by a predetermined amount (ERR) to create a test return rate (TRR) and continues to step 1204.

In step 1204, the control system 166 checks to see whether the test return rate (TRR) is less than or equal to zero. If the test return rate (TRR) is less than or equal to zero, the control system 166 branches to step 1214 and returns the removal rate (RR) as the calculated return rate. If the test return rate (TRR) is not less than or equal to zero, the control system branches to step 1206.

In step 1206, the control system 166 executes the soil effects calculation module 1300 using the test return rate (TRR) and the other inputs shown in FIG. 13 and continues to step 1208.

In step 1208, the control system 166 compares the soil loss calculated by the soil effects calculation module 1300 calculated in step 1206 using the test return rate (i.e. the soil_loss (TRR)) with a predetermined threshold soil loss rate (threshold_loss) to determine whether the soil loss at the test return rate (TRR) has resulted in soil loss exceeding a predetermined threshold. If the soil loss has exceeded the threshold soil loss rate, the control system 166 continues to step 1214. If the soil loss is not exceeded the threshold soil loss rate, the control system 166 continues to step 1210.

In step 1210, the control system 166 compares the soil quality indices calculated by the soil effects calculation module 1300 in step 1206 using the test return rate (i.e. the soil_quality_indices (TRR)) with predetermined threshold soil quality values (threshold_quality) to determine whether the soil quality at the test return rate (TRR) has has fallen below predetermined thresholds. If the soil quality has dropped below the threshold soil quality values, the control system 166 continues to step 1214. If the soil quality has not dropped below the threshold soil quality values, the control system continues to step 1212.

In step 1212, the control system 166 sets the return rate (RR) equal to the test return rate (TRR) and branches back to step 1202.

The process illustrated in FIG. 12 ensures that the soil loss does not exceed a predetermined threshold and the soil quality does not dropped below a predetermined threshold.
Other Variable Inputs to the Soil Effects Calculation Module 1300

Calculating the return rate dynamically as the agricultural harvester 100 travels through the field by the soil effects calculation module 1300 is beneficial since it permits the soil effects calculation module 1300 to recalculate the soil effects (soil loss and soil quality) of a particular biomass return rate based upon changes in any of the input variables to the soil effects calculation module 1300 that change dynamically as the agricultural harvester 100 travels through the field and therefore cannot be known prior to harvesting.

For example, the crop yield 1306 may be measured directly from the crop being harvested as the agricultural harvester 100 travels through the field. This crop yield is measured dynamically and provided by the yield sensor 161 in the configuration shown in FIG. 1.

If all of the inputs to the soil effects calculation module 1300 are known in advance, (e.g. prior to the agricultural harvester 100 entering the field), however, the permissible return rate for each location in the field can be calculated by the soil effects calculation module 1300 on a remote computer prior to the agricultural harvester 100 entering the field. In this arrangement, control system 166 is be configured to look up the return rate in a map of return rates stored in the memory circuits of control system 166, thus obviating the need to have the soil effects calculation module 1300 executed by the control system 166 dynamically as the agricultural harvester 100 travels through the field.

Thus, with no dynamic inputs, it is not necessary that the control system 166 on the agricultural harvester 100 execute the iterative process described above in conjunction with FIG. 12. In short, the control system 166 can be configured to calculate a return rate at every location in the field that ensures that soil erosion does not exceed a predetermined threshold, and that any or all of the soil quality indices do not fall below a predetermined threshold.

Controlling the Return Rate (Step 406)

Having determined the return rate in step 404, either dynamically or by retrieving data from a map of return rates, the control system 166 controls the return rate by varying the relative amounts of biomass left on the ground and biomass transmitted to the biomass accumulator 106.

The control system 166, using the return rate for the location in the field calculated in step 402, calculates a position of the biomass gate 148 that will return sufficient biomass to the field to ensure that the quantity biomass removed and deposited in the biomass accumulator 106 for the location in the field leaves sufficient biomass on the ground to not exceed the soil quality threshold or thresholds.

To do this, the control system 166 determines the amount of biomass that should be distributed over the ground to ensure the calculated return rate of biomass, determines the amount of biomass distributed over the ground by reading the signals from one or more of the first mass flow sensor 155A, the second mass flow sensor 155B and the third mass flow sensor 155C, and drives the actuator 154 to ensure the amount of biomass distributed over the ground equals the calculated return rate of biomass.

The control system 166 is further configured to record the amount of biomass harvested from the soil and deposited in the biomass accumulator 106 as a map. The control system 166 is further configured to record the amount of biomass that is returned to the soil as a map.

What is claimed is:

1. An agricultural harvester (100) comprising:
a control system (166) configured to:
calculate a plurality of biomass return rates as the agricultural harvester traverses an agricultural field, wherein each of the plurality of biomass return rates is iteratively calculated until an estimated soil loss exceeds a soil loss threshold or at least one of estimated soil quality indices fall below a soil quality threshold, wherein each calculation comprises:
starting with a proposed biomass return rate of one hundred percent and calculating the estimated soil quality indices and the estimated soil loss;
for every subsequent iteration, reducing the proposed biomass return rate by a predetermined amount and recalculating the estimated soil quality indices and the estimated soil loss; and
when the estimated soil loss exceeds the soil loss threshold or at least one of the estimated soil quality indices falls below the soil quality threshold, setting the biomass return rate to the proposed biomass return rate of the previous iteration; and
control a biomass harvesting rate based upon the calculated biomass return rate.

2. The agricultural harvester (100) of claim 1 wherein the control system (166) comprises a plurality of ECUs (168) configured to communicate with each other over a communication bus.

3. The agricultural harvester (100) of claim 1, herein, further comprising:
a biomass gate (148) configured to vary a deposition rate of biomass upon the ground, wherein the biomass is harvested by the agricultural harvester (100); and
wherein the control system (166) further comprises at least one ECU (168) drivingly coupled to the biomass gate (148), and wherein the at least one ECU (168) is configured to determine soil effects based upon a crop yield, the soil effects including the estimated soil loss and the estimated soil quality indices.

4. The agricultural harvester (100) of claim 3 herein, wherein the at least one ECU (168) is coupled to a yield sensor (161) that is disposed on the agricultural harvester (100) and is configured to indicate a yield of a harvesting operation performed by the agricultural harvester (100) as that harvesting operation occurs.

5. The agricultural harvester (100) of claim 3, wherein the at least one ECU (168) is configured to calculate the calculated soil effects based upon one or more parameters selected from the group comprising supporting practices, crop rotations, and field operations.

6. The agricultural harvester (100) of claim 3, wherein the at least one ECU (168) is configured to calculate the soil effects based upon field operations to be conducted subsequent to a time the at least one ECU (168) calculates the soil effects.

7. The agricultural harvester (100) of claim 6, wherein the field operations to be conducted subsequent to the time the at least one ECU (168) calculates the soil effects include one or more operations selected from the group comprising disking, harrowing, raking, ripping, chemical spraying, windrowing, planting, and harvesting.

8. The agricultural harvester (100) of claim 3, wherein the at least one ECU (168) is configured to calculate the calculated soil effects based upon one or more parameters selected from the group comprising climate factors, field management practices, topographical parameters, soil parameters, and crop parameters.

9. The agricultural harvester (100) of claim 8, wherein the climate factors comprise at least one of (1) an amount of precipitation, (2) a type of precipitation, (3) a precipitation intensity, (4) an air temperature, (5) a wind speed, and (6) a wind direction, to which the field being harvested by the agricultural harvester (100) is subjected.

10. The agricultural harvester (100) of claim 8, wherein the climate factors are to be experienced by the agricultural field being harvested at a date subsequent to the date the ECU (168) calculates the soil effects.

11. The agricultural harvester (100) of claim 8, wherein the topographical parameters include at least one of slope and slope length at the field being harvested.

12. The agricultural harvester (100) of claim 8, wherein the soil parameters are selected from the group comprising clay content, sand content, organic matter content and silt content.

13. The agricultural harvester (100) of claim 1, wherein soil effects further include at least one of an organic matter (OM) index, a field operations index (FO), and an overall soil quality index.

14. The agricultural harvester (100) of claim 1, wherein the control system (166) is disposed on a chassis (116) of the agricultural harvester (100) to be carried by the agricultural harvester (100) through fields being harvested.

15. The agricultural harvester (100) of claim 1 wherein the control system (166) includes at least one remote ECU (168) that is disposed remotely from an agricultural harvesting vehicle (102) that comprises the agricultural harvester (100), and further wherein the at least one remote ECU (168) is configured to determine the biomass harvesting rate based upon soil effects for plurality of locations within an agricultural field, and to save the biomass harvesting rate as function of location in the agricultural field for plurality of locations in the agricultural field in the form of a map prior to the agricultural harvester (100) harvesting the agricultural field.

16. The agricultural harvester (100) of claim 1, wherein the soil effects are calculated using Revised Uniform Soil Loss Equations.

17. The agricultural harvester (100) of claim 16, wherein the Revised Uniform Soil Loss Equations are implemented in a digital microprocessor program stored in one or more electronic memory circuits of the plurality of ECUs (168).

18. The agricultural harvester (100) of claim 16, wherein the Revised Uniform Soil Loss Equations are implemented in one or more dynamic linking libraries that are stored in the one or more electronic memory circuits of the plurality of ECUs (168).

19. The agricultural harvester (100) of claim 1, further comprising a mass flow sensor configured to sense a flow rate of biomass through the agricultural harvester (100).

* * * * *